United States Patent [19]

Miller

[11] Patent Number: 4,536,671
[45] Date of Patent: Aug. 20, 1985

[54] DYNAMOELECTRIC MACHINE STATOR MOUNTING MEANS AND METHOD OF MAKING SAME

[75] Inventor: William H. Miller, Albany, N.Y.

[73] Assignee: General Electric Company, Fort Wayne, Ind.

[21] Appl. No.: 487,964

[22] Filed: Apr. 25, 1983

[51] Int. Cl.³ .............................................. H02K 1/12
[52] U.S. Cl. .................................... 310/258; 310/259; 310/91
[58] Field of Search ................... 310/51, 258, 259, 91, 310/254

[56] References Cited

U.S. PATENT DOCUMENTS

| | | | |
|---|---|---|---|
| 2,424,299 | 7/1947 | Baudry et al. | 310/51 U X |
| 2,720,600 | 10/1955 | Pollard | 310/51 |
| 2,754,441 | 7/1956 | Morgan | 310/258 |
| 2,811,659 | 10/1957 | Barlow et al. | 310/258 |
| 2,846,603 | 8/1958 | Webster et al. | 310/258 |
| 2,973,442 | 2/1961 | Wilson | 310/258 |
| 3,462,624 | 8/1969 | Darrieus | 310/258 X |
| 3,988,622 | 10/1976 | Starcevic | 310/91 |
| 4,204,313 | 5/1980 | Khutoretsky et al. | 29/596 |
| 4,284,920 | 8/1981 | Nelson | 310/258 X |

Primary Examiner—Donovan F. Duggan

[57] ABSTRACT

A stator core support structure and an assembly of a stator core in a core support structure, both characterized by having a plurality of stress-relief devices that are mounted at selected areas of high radial rigidity on the core support structure to transmit a predetermined compressive force from the support structure to a stator core mounted in it with an interference fit, thereby to secure the stator core in a predetermined geometric configuration. The method of the invention includes the steps of mounting a plurality of stress-relief devices at selected points between a stator core and a support structure surrounding it, and loading each of said devices to transmit compressive forces to said points of the stator to secure it in a desired geometric configuration within the support structure.

17 Claims, 7 Drawing Figures

Provide a stator surrounded with a plurality of arcately spaced, axially extending core support rods.

Provide a stator support structure having a plurality of stress-relief means each, respectively, mounted between one of the rods in a first selected group of the core support rods and an adjacent portion of the support structure having high radial rigidity.

Position the stator within the support structure in an interference fit with each rod of the second selected group of core support rods between the stator and an adjacent portion of the support structure having relatively low radial rigidity, thereby holding the stator in a predetermined geometric configuration, by the compressive forces transmitted to it from the support structure through the first and second groups of core support rods.

DYNAMOELECTRIC MACHINE STATOR MOUNTING MEANS AND METHOD OF MAKING SAME

FIELD OF THE INVENTION

The invention relates to dynamoelectric machine stator support structures and to methods for manufacturing such structures; more particularly, it relates to mounting means that are effective in operation to support a stator core that is mounted in an interference fit with the ribs of a surrounding housing so that the core is maintained in a desirable predetermined geometric configuration. In most probable applications of the invention, the predetermined geometric configuration of the core likely to be desired will be such that its peripheral surface is substantially cylindrical in form.

In the manufacture of stator core support structures, it has become fairly common practice to form an interference fit between a core and associated housing ribs, or other support structures that engage the core, in order to rigidly mount the core in fixed position relative to either the housing ribs or such other support structure. To achieve such an interference fit, one well-known procedure is to significantly increase the temperature of a stator frame relative to that of the stator core, thereby to thermally realize sufficient expansion of the inner diameter of the surrounding housing to enable the stator core to be readily inserted within a cooperating core-receiving bore of the support structure. After the stator core is thus inserted into a desired relationship within the support structure, the temperatures of both members are allowed to equalize thus causing the surrounding core-support diameter to shrink sufficiently to provide the desired interference fit with the stator core structure that it engages.

In practicing such prior art manufacturing techniques, it has often been found that a stator core thus mounted with an interference fit in a support structure housing will have its internal diameter distorted to an out-of-round configuration. Such distortion is usually due to variations in different compressive forces being applied to arcuately spaced areas of the stator core by its engagement with portions of the support structure, which in turn may vary in their respective degrees of radial rigidity. To enable a dynamoelectric machine rotor to be mounted for rotation within the central bore of such a stator core, it is frequently necessary to perform a machining operation on the internal diameter of the stator core to afford adequate air gap between them. After the stator is mounted with the above-mentioned interference fit into a support structure, such a machining operation is cumbersome and expensive to perform because it requires movement of the entire stator core and support structure assembly relative to a suitable metal boring machine which is operable to remove metal from selected portions of the internal diameter of the stator core in order to bring that diameter, with an acceptable range of manufacturing tolerances, to a cylindrical surface configuration that will enable a rotor to be safely operated within the stator, without risk of the rotor rubbing on that stator when it is subjected to normal operating conditions.

Of course, the need to thus machine away portions of the internal surface of the stator core to reestablish a suitable generally cylindrical configuration within it has other disadvantages beyond the cost and inconvenience of such a machining operation. For example, such machining usually results in the formation of an air gap for the finished dynamoelectric machine that is wider than would be desirable for an optimum air gap, because the relative outer diameter of the rotor and inner diameter of the stator core, i.e., the width of the air gap between the rotor and stator, cannot be precisely designed in advance due to the unknown degree of machining that will be required to reestablish the stator core bore to a sufficiently cylindrical configuration to produce a uniform interaction between the rotor and stator.. The uniform interaction reduces the magnitude of losses in the motor, as built.

A second disadvantage resulting from a need to machine either the internal diameter of the stator core or the outer diameter of a cooperating rotor, in order to provide sufficient rotating air gap clearance between those members, is that as a consequence of the machining there often exists a significant variation in the air gap width from point-to-point around the periphery of the rotor. Such a variation in the width of the air gap results in a corresponding variation in the magnetic reluctance of the air gap and causes an undesirable distortion in the electromagnetic forces developed by the machine during its operation. It has long been recognized that such variations in the electromagnetic forces within a machine will cause vibration and resultant noise, both of which are undesirable and often require that further modifications be made to the machine in order to dampen or restrict to a permissible level the degree of vibration or noise that is produced during normal operation of the machine.

BACKGROUND OF THE INVENTION

There is known to exist in the prior art numerous different methods and a wide variety of dynamoelectric machine structures that are designed to be useful in reducing vibration that is created by the operation of such machines. Such prior art methods and apparatus structures are distinguished from the present invention by their respective characteristic features, but in general they differ from the present invention by being designed to be primarily useful in coping with the problems of vibration in a finished machine, rather than being designed and useful in the prevention of the causes of such vibration at the time the machine is manufactured, as is the case with the present invention. Some examples of such vibration-damping structures and methods are shown in U.S. Pat. Nos. 4,204,313; 2,846,630; 2,811,659 and 2,720,600, each of which discloses either undercut, axially extending, stator-core-supporting resilient ribs, or undercut resilient housing ribs having portions that engage axially extending bars on the respective illustrated stator cores. Such undercut rib portions are made sufficiently resilient (or are arranged so they are not stressed beyond their inherent elasticity) to absorb much of the vibration that may be induced in a stator core during its operation, but in none of the disclosed cases does it appear that the under-cutting is either designed to, or in fact serves to, reduce the causes of such vibration. For example, none of these disclosed cases appear to suggest ways of making the air gap between a rotor and stator of such a machine more uniform over its circumference.

A somewhat similar type of vibration damping function is commonly provided in various known prior art types of dynamoelectric machine structures by a variety of snubber or torsion bar arrangements that are typically disposed between a stator core and a surrounding support housing to limit the amount of vibration that can be transmitted from the core to the housing during normal operation of a machine. For example, U.S. Pat. Nos. 3,708,707; 2,973,442; 3,772,542 and 2,953,697 disclose various forms of resilient snubbers or spring leaf members that are mounted in either tension or compression between a stator core and relatively rigid portions of a surrounding housing to effect such vibration damping.

U.S. Pat. Nos. 2,754,441 and 4,060,744 further disclose the use of torsion bar support arrangements mounted between stator cores and adjacent housing ribs of a surrounding rigid housing. Such torsion bar arrangements are similar to the other known prior art anti-vibration mounting means in that they are operable to accommodate vibration induced in a stator, but they are not effective to remove the causes of such vibration at the time the machine is manufactured.

It is also known in the prior art to provide rigid stator core mounting arrangements that enable the core position to be adjusted relative to a supporting housing, thereby to provide a more precise and uniform air gap between the stator and an associated rotor. U.S. Pat. No. 3,519,857, for example, discloses such a rigid stator core support means in which a plurality of adjustable fasteners are used to selectively apply pressure to different points around the periphery of a stator, thereby to accurately position it relative to a desired axis of rotation through the housing, which may be eccentric to the main central axis of the housing, but which would correspond exactly with a desired axis of rotation of an associated rotor. A common feature of this patent and the other prior art patents mentioned above, is that its core positioning means and the vibration damping snubbers or undercut portions disclosed in the other patents are distributed at equiangular points around a stator core in order to provide uniformly distributed pressure to the core around its circumference. Thus, in practice, such known prior art structures and vibration-dampening methods are not effective to counteract or avoid the application of unequal pressures being applied at different points to a stator core by portions of a surrounding stator support housing that have different degrees of radial rigidity. Accordingly, such known prior art structures and methods are not useful for preventing a stator core from being distorted into an out-of-round configuration by the forces transmitted to it from surrounding housing ribs into which the core is thermally shrunk-fit.

Finally, it is known in the prior art, as disclosed in U.S. Pat. No. 4,145,626, to mount a stator core in a core-supporting housing by positioning a plurality of axially extending ribs around the stator core between it and annular ribs of the supporting housing. In that patent, in order to provide relatively uniform stressing of each of the supporting ribs, only those supporting ribs adjacent the most rigid portions of the surrounding annular ribs of the housing are made resilient by undercutting the ribs. The remainder of the ribs, i.e., those at the upper and lower portions of the surrounding housing, are not undercut, therefore, the possibility of stress-relieving those ribs in response to either radial distortions of the stator core caused by different distributions in the core weight or by electrodynamic forces applied to the core during operation of the machine, are substantially eliminated. The vibration damping means shown in that patent differ from the present invention in numerous important respects. For example, the anti-vibration mounting means shown in that patent are not applied to an interference-fitted stator core and support housing assembly. Accordingly, no provision is made in that disclosure for preventing the distortion of a stator core due to its interference fit with the supporting housing. Moreover, no provision is made in the teaching of that patent for preventing the distortion of a stator core from a desirable predetermined configuration, such as the normally desirable generally cylindrical configuration that the inner diameter of a stator core should have in order to enable it to fit closely and precisely with an associated rotor. In addition, the vibration damping resilient support ribs used in the embodiments disclosed in U.S. Pat. No. 4,145,626 are not pre-stressed or pre-loaded to any apparent significant desired level when the machine is initially manufactured, but rather are mounted in an essentially unstressed condition that is effective to fully preserve the resilience of those ribs for their intended vibration damping purposes when the electrodynamic forces resulting from operation of the machine cause irregular distortions of the stator core as the machine is energized.

SUMMARY OF THE INVENTION

In a preferred embodiment of the invention a plurality of stress-relief means are mounted with a predetermined loading, respectively, at preselected points on some of the annular ribs of a stator support structure to assist in operably supporting a stator core in the stator support structure. The stress-relief means are effective when thus loaded to apply predetermined compressive forces to sections of a stator core mounted within the stator supporting housing. Those compressive forces operate in combination with other radial compressive forces applied to the stator core, from areas of relatively low radial rigidity of the stator supporting housing, to effectively support the stator core in a pre-selected geometric configuration, such as a generally cylindrical shape that corresponds closely in outline to the cylindrical shape of an associated rotor designed for rotation within the bore of the stator core.

In the method of the invention, a stator core is interference-fitted in a stator-supporting housing having annular ribs that are characterized by having areas of relatively high radial rigidity separated from other areas of substantially lower radial rigidity. Stress relief means are mounted between certain of the annular ribs of the housing adjacent their areas of highest radial rigidity, and axially extending ribs that are mounted between the stator core and the ribs of the support housing at angularly spaced points, such that certain of the axially extending ribs engage the stress relief means while other of those ribs directly engage the annular ribs adjacent their relatively low-radial-rigidity portions. Responsive to the stator core being shrunk fit within the ribs of the support housing, the stress relief means are operable to transmit a predetermined compressive force to the axially extending ribs on the core that are in engagement therewith, which force is made essentially equal to the compressive force transmitted to the axially extending stator ribs in engagement with the areas of low radial rigidity of the annular housing ribs. Accordingly, the stator core is maintained in a desired geometric configuration such that it has a substantially cylindrical inner diameter in practicing certain desired arrangements of the method of the invention.

A stator support structure constructed according to the invention utilizes a plurality of stress relief means disposed at unequal angular locations around the stator-receiving bore of the structure in order to transmit compressive forces from areas of relatively high radial rigidity of the support structure to a stator core, responsive to such a core being operably mounted in an interference fit within the bore of the support structure. The compressive forces transmitted by the loading of the stress relief means are determined so they are substantially equal to the compressive forces transmitted from areas of lower radial rigidity of the support housing to portions of an associated core disposed in compressive relationship therewith. In operation, the core support structure is effective to support a stator core in a desired predetermined configuration responsive to the stator being shrunk-fit within the supporting structure.

OBJECTS OF THE INVENTION

Primary objects of the invention are to provide a stator support structure, and a method for manufacturing such a structure, which obviate the disadvantages of prior art stator support structures and associated methods of manufacture.

Another object of the invention is to provide a stator support structure that is effective in operation to secure a stator core in an interference fit therewith such that substantially equal compressive forces are applied to the core at spaced points thereon even though such forces react with portions of the stator support structure that vary significantly in radial rigidity around the circumference of the core. A major advantage of the stator support structure of the invention is that such a distribution of core-compressing forces makes it possible to apply greater interference-fit pressures from the support structure to the core, thereby to reduce or eliminate the need for torque pins or other keying means that were often required in prior art designs to prevent a stator core from rotating within its support structure.

Yet another object of the invention is to provide a stator support structure and stator assembly that are secured together with an interference fit in a manner that supports the stator core in a desired predetermined geometric configuration, within a narrow range of manufacturing tolerances, that assures the preservation of a desired relatively narrow air gap between the internal diameter of the stator core and an associated rotor mounted for rotation therein. A further significant advantage of the invention is that such an accurately designed and manufactured assembly permits the employment of wider than normal manufacturing tolerances for the punched laminations and assembly of an associated rotor, without incurring the undesirable risk of having the rotor rub on the stator core during operation of the assembled machine.

A still further object of the invention is to provide a method for manufacturing a stator core support structure and stator core assembly that is economical to practice and that results in a more consistently producible assembly design than was possible with prior art techniques.

A further object of the invention is to provide a method for manufacturing a stator core and stator support structure assembly that utilizes stress-relief means positioned at selected, unequally spaced points around the circumference of the stator core, between it and the support structure, thereby to rigidly hold the stator core in an inteference fit with the support structure in a desired predetermined geometric configuration that optimizes the operating relationship between the stator core and an associated rotor.

Yet another object of the invention is to provide a method of making and mounting stress relief means between selected portions of a stator support structure and a stator core, such that the compressive forces transmitted, respectively, through the stress relief means to the core can be readily determined and designed to correspond accurately with the compressive forces transmitted to other portions of the core from different areas of the support structure which have a lower radial rigidity than the areas on which the stress relief means are mounted.

Additional objects and advantages of the invention will become apparent to those skilled in the art from the description of it presented herein, considered in conjunction with the accompanying drawings.

DESCRIPTION OF THE PREFERRED EMBODIMENTS

Figure 1:
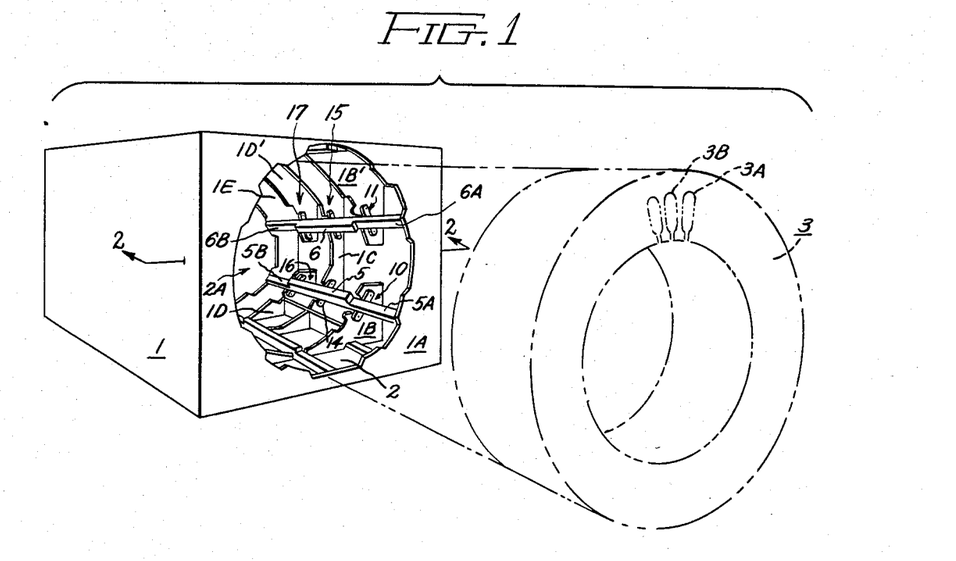
FIG. 1 is an exploded, perspective view of a stator support structure constructed according to the present invention and shown adjacent a stator core that is adapted to be interference-fitted in operating position within the support structure to form a stator core and stator support structure assembly according to the invention.

A stator support structure constructed according to the invention is particularly useful in the manufacture of machines that are designed within structural constraints that result in the support structure having areas of differing radial rigidity disposed around a stator core that is mounted with an interference fit in operating relationship within the structure. For example, it is often necessary to design a machine housing for application within a relatively limited vertical space, even though the designer is permitted considerably more room for accommodating the housing or support structure in a horizontal direction. As mentioned at the outset, the present invention is particularly useful for constructing a stator support structure that is not only capable of accommodating such basic design constraints but also is effective to afford the desirable objectives of the invention set forth above. The preferred embodiment of the invention shown in FIG. 1 is illustrated with respect to such a design requirement, i.e., a dynamoelectric machine housing 1 is constructed to have a substantially shorter vertical dimension than the horizontal or width dimension for the housing. A stator support structure 2 is positioned within the housing 1 and is operable to secure a generally cylindrically shaped stator core 3 in fixed position within the stator-receiving bore 2A defined by the support structure. In this embodiment of the invention the stator support structure 2 includes the axially outer end walls 1A and 1E of housing 1 and a plurality of ribs 1B, 1C and 1D. These ribs are generally annular in construction, but it will be seen that some of them comprise a plurality of sections, for example, sections 1B and 1B' which effectively function as a single annular rib in their support function, and in like manner sections 1D and 1D' function as another annular rib mounted within the housing 1. Side walls of the housing 1 and the respective end walls 1A and 1E are made of a suitable steel plate stock that is cut and welded to form a unitary structure with processes well known in the art.

The stator core 3 is made up of a stack of punched magnetic iron stator laminations that are each either generally annular in configuration or comprise sections of an annulus, and are each provided with a plurality of spaced winding-receiving slots 3A, 3B, etc., positioned at equiangular locations around the inner circumference of the core. Those skilled in the art will recognize that to complete the stator a suitable stator energizing winding will be mounted in the respective slots in a well-known manner, thus further explanation and illustration of such features are not provided here because they do not affect or facilitate an understanding of the present invention.

A plurality of stator core support members 4, 5, 6, 7, 8 and 9 (also see FIG. 2) are disposed at arcuately spaced points around the stator-receiving bore 2A to provide a means for transmitting compressive forces between the stator core 3 and annular ribs 1B-1D as well as to the respective end walls 1A and 1E and annular ribs 1B-1D of the stator support structure. At this point it should be recognized that the core support members 4-9 may take a variety of different forms, and may be operably mounted on either the core support structure 2 or on the circumference of the stator core 3. In the illustrated embodiment of the invention, the core support members are secured in fixed position relative to the core support structure 2 by being welded to it in a conventional manner. Each of the core support members 4-9 is made of steel bar stock and comprises a bar mounted adjacent the outer periphery of the magnetic stator core 3 to extend over substantially its full axial length when the core is operably positioned within the housing 1. The two opposite axially outer ends of each of the core support members 4-9 are provided with a radially recessed, axially outer surface relative to the respective axially central area of each of the core support members. For example, as shown in FIG. 1, the opposite ends of the core support member 5 each have radially recessed axially outer surfaces 5A and 5B that extend, respectively, from the outer end walls 1A and 1E of the housing 1 to points at, or closely adjacent to, the next adjacent annular ribs 1B or 1D of the support structure 2. Similar recesses are made in axially outer surfaces of each of the other core support members, as partially shown in FIG. 1, but they are not identified by separate numbers in the drawing. The purpose and function of the radially recessed outer surface areas of the core support members is to reduce the compressive forces that are transmitted through the core support members to the two outer housing end walls 1A and 1E, relative to the compressive forces that are transmitted to the inner annular ribs 1B, 1C and 1D responsive to an interference-fit being established between the core support members and said inner ribs when the stator core 3 is operably mounted therein, as will be more fully described below.

As can be seen clearly in FIG. 1, each of the annular ribs 1B-1D has a radially innermost surface that conforms generally in configuration to the radially outermost surface of the stator 3 which is adapted to be positioned within the bore 2A of the stator support structure 2. The annular ribs are also formed to be welded or otherwise suitably supported to the sidewalls of the housing 1. Consequently, each of the annular ribs has areas of high radial rigidity and separate areas of lower radial rigidity thereon. The respective areas of lowest radial rigidity on the annular ribs 1B-1D are the radially thinnest portion of those ribs that is located near the respective centers of the upper and lower walls of the housing 1, as is seen in FIG. 1. Those areas of lowest radial rigidity on the ribs are spaced a substantial arcuate distance from other areas of highest radial rigidity on the ribs, such as the areas thereof disposed inward from the respective four corners of the sidewalls of the housing 1. It should be appreciated at this point that the areas of lowest radial rigidity of the annular ribs 1B-1D are not capable of transmitting as great a radial compressive force through the support members 4-9 into the stator core 3, as are the areas of highest radial rigidity of the annular ribs 1B-1D at the radially thicker corner sections thereof. Consequently, if the stator core 3 were to be interference-fitted into the support structure bore 2A and allowed to apply a compressive force through the respective support members 4-9 directly to the annular ribs 1B-1D, either the ribs of structure 2, or the stator core 3 would be deflected to an out-of-round configuration. Such distortion is due to the variations in compressive forces being transmitted from the areas of lowest radial rigidity of the annular ribs 1B-1D, compared with the higher compressive forces being transmitted radially from their respective areas of highest radial rigidity. In order to avoid out-of-round distortions of the stator 3, a plurality of stress-relief means are mounted, respectively, at predetermined spaced points on each of the annular ribs 1B-1D of the support structure 2. According to the invention each of the stress-relief means is made effective to be loaded to apply a predetermined compressive force to the stator 3 responsive to its being mounted in an interference fit for operation within the bore 2A. The compressive force applied by each of the stress-relief means is determined, according to the invention, so that it is effective in combination with other radial compressive forces applied to the stator 3 from the areas of lowest radial rigidity of the annular ribs, responsive to the stator 3 being operably mounted in the bore 2A, to support the stator 3 in a desired, preselected geometric configuration within a narrow range of acceptable manufacturing tolerances.

Figure 2:
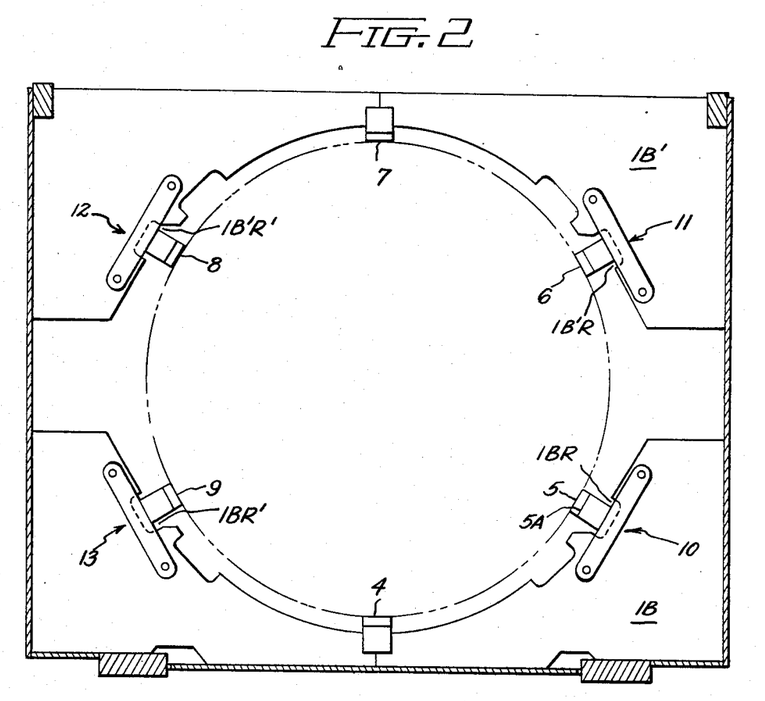
FIG. 2 is an end elevation view, along the plane 2—2 shown in FIG. 1, illustrating the stator support structure shown in FIG. 1 and particularly depicting some of the structural detail of the stress-relief means that are mounted thereon according to the invention.

The figures of the drawing do not show all of the stress-relief means that are mounted in the housing 1 of the illustrated embodiment of the invention. It should be understood that each of the stress-relief means can take various forms in alternative embodiments of the invention, but in the preferred embodiment of the invention described first herein, each of the stress-relief means is made substantially identical in construction and operation to the other stress-relief means. One preferred form of the stress-relief means used in practicing the preferred embodiment of the invention is shown in FIGS. 1–5 and is designated generally by the number 10. In addition to the stress-relief means 10, three additional stress-relief means 11, 12 and 13 are mounted on the annular housing rib comprising the sections 1B and 1B', as best seen in FIGS. 1 and 2. Similar sets of four individual stress-relief means are mounted respectively on the annular housing ribs 1C and 1D as shown, in part in FIG. 1, by the stress-relief means designated 14 and 15 on the annular rib 1C and further by the stress-relief means 16 and 17 mounted respectively on the annular rib portions 1D and 1D', in FIG. 1.

Figure 3:
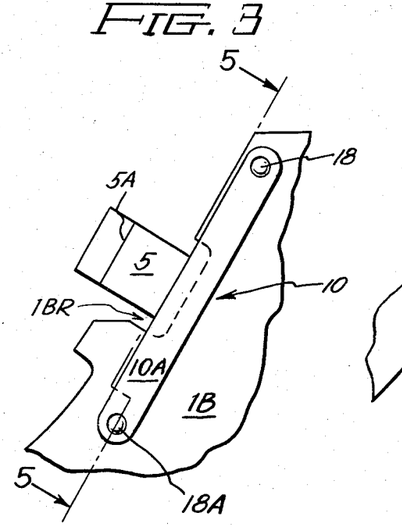
FIG. 3 is an enlarged, fragmentary end elevation view of one of the stress-relief means shown in FIGS. 1 and 2.
Figure 4:
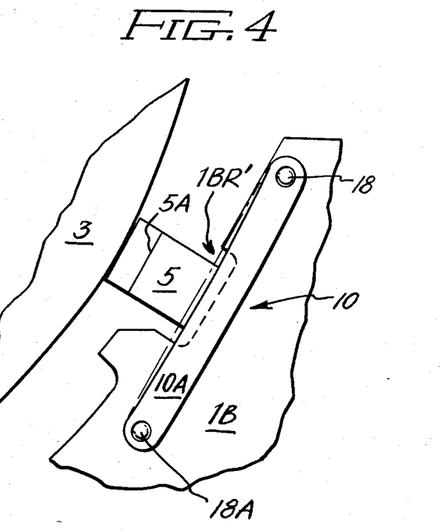
FIG. 4 is an end elevation view showing the stress-relief means depicted in FIG. 3 in relation to a fragment of a stator core mounted in operating position within the stator support structure such that a compressive force is transmitted between the stress relief means and the adjacent portion of the core thereby causing a predetermined deflection of the stress-relief means in a radially outward direction.
Figure 5:
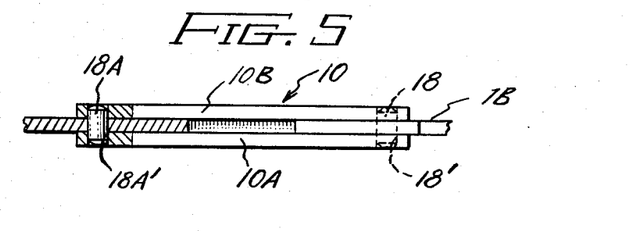
FIG. 5 is a fragmentary cross-sectional view, along the plane 5—5 in FIG. 3, showing a stress-relief means mounting arrangement relative to one of the annular ribs of the stator support structure illustrated therein and in FIG. 1-4.

In the preferred embodiment of the invention since each of the stress-relief means is identical, only the stress-relief means 10 that is shown mounted on the annular rib portion 1B between it and the core support member 5 will be described in detail. Following that description various alternative forms of suitable stress-relief means for practicing other forms of the invention will be discussed. As seen in FIGS. 3–5, the stress-relief means 10 comprises at least two bars 10A and 10B that are each mounted, respectively, on opposite sides of the rib 1B, and adjacent to a recess 1BR in the radially inner surface thereof, according to the invention. In order to permit the bars 10A and 10B of the stress-relief means 10 to be loaded by being deflected radially outward in response to compressive forces transmitted to the bars through the core support member 5, as a stator core 3 is interference-fitted within the bore 2A, the above-mentioned recess 1BR is provided in the generally cylindrical surface of the inner edge of the annular rib 1B. Similarly, all of the ribs 1B–1D, which conform generally in configuration to the radially outermost cylindrical surface of the stator 3 adapted to be positioned therein are formed with a plurality of additional recesses such as the recesses 1B'R, 1B'R', and 1BR' shown in FIG. 2, respectively, in the annular rib sections 1B and 1B'. Each of the recesses 1BR, 1B'R, etc., can be made in various alternative configurations, but it will be recognized that any such configuration must be adequate to accommodate free movement of the core support members 5, 6, 8 and 9 in a radially outward direction, without allowing them to encounter the annular rib on which the abutting stress-relief means is mounted.

The support member 5 is mounted in fixed relation to the stress-relief bars 10A and 10B by being welded to them, as are each of the other support members 4, 6–9 welded, respectively, to the stress-relief bars in engagement therewith in the preferred embodiment of the invention. In alternative forms of the invention the support members 4–9 may be mounted in fixed relation on the stator core 3 by being welded to spaced points thereon that position the support members for engagement with the respective stress-relief means 10, etc., in the manner described above.

In addition to the bars 10A and 10B comprising the preferred form of stress-relief means 10 illustrated in FIGS. 3–5, the preferred stress-relief means comprises suitable mounting means for mounting opposite ends of the bars in relatively fixed relation to the rib 1B on which it is mounted, while positioning a central portion of the bars in spaced relation to the rib 1B thereby to transmit the desired predetermined compressive force to the stator 3. As shown in FIG. 5, the central portion of each of the bars 10A and 10B is positioned generally parallel to an adjacent side of the rib 1B on which it is mounted and those central portions are free to be deflected radially outward a predetermined distance without moving into abutting engagement with the rib 1B, responsive to a compressive force being transmitted from the core support bar 5 to a stator 3 when it is mounted in interference-fitted relationship in the bore 2A. In this form of the invention, each of the mounting means for the respective stress-relief means is made substantially identical in structure and function; thus, only the mounting means used in conjunction with the stress-relief means 10 shown in FIGS. 3–5 will be described in detail. That mounting means comprises a pair of fulcrum supports 18 and 18A respectively arranged to engage the bars 10A and 10B adjacent to opposite ends thereof. In this form of the invention, the fulcrum supports 18 and 18A comprise a pair of steel pins that are mounted respectively in fixed position within suitable apertures through the associated ribs, such as the illustrated rib 1B, and are disposed to project therefrom in a direction generally transverse to the direction of desired radial deflection of the bars 10A and 10B mounted thereon.

In the most preferred form of the invention the steel pins 18 and 18A are mounted respectively in apertures 18' and 18A', which are formed in any suitable manner through the rib 1B adjacent to opposite sides of the recess 1BR, in order to receive the pins 18 and 18A in a desirable rotating fashion. Each of the pins are disposed in the respective apertures to project outward from opposite sides of the rib 1B, and may be welded to the rib or otherwise suitably secured in position within the apertures and relative to the rib 1B. Accordingly, each of the pins 18 and 18A are arranged to engage the bars 10A and 10B adjacent to the opposite ends thereof and are effective to support those opposite ends of the bars for pivotal movement around the resultant fulcrum supports (18 and 18A) responsive to a compressive force being applied to the central portions of the bars 10A and 10B by force transmitted through the support member 5 from a stator 3, thereby to deflect the central portions of the bars 10A and 10B outward. Preferably each of the pins 18A and 18B is secured in position relative to the bars 10A and 10B supported thereon in order to effectively limit movement of the bars in an axial direction of the respective pins while at the same time enabling the bars to pivot around the longitudinal axis of each of those pins. In addition, each of the pins 18 and 18B is held in relatively fixed relation to the rib 1B on which it is mounted, in this embodiment of the invention, but it will be recognized that in alternative embodiments of the invention the pins may be allowed to rotate both with respect to the bars 10A and 10B, and the rib 1B through which they are inserted. Thus, in some embodiments of the invention each of the pins 18A, 18B, etc., is mounted to be free to rotate in the aperture supporting it through the rib 1B in which it is mounted.

From the foregoing description it should be understood that although only one of the stress-relief means 10 has been described in detail, the remaining stress-relief means mounted on the support structure 2, such as the stress-relief means 10–17, will each be provided with similar fulcrum support means such as the supports 18 and 18A, and with associated recesses such as the recess 1BR shown in annular rib 1B. Further, it will be recognized that various materials may be used to form the bars 10A and 10B, and the fulcrum supports 18A and 18, but in this embodiment of the invention all of those members are formed of readily available a high-strength, high-yield point steel (at least 100,000 PSI yield point). Such steel is available, for example, from Lukins Steel Company, Coatsville, Pa., as Stock T-1. Other equivalent steels may be used if they meet the requisite strength as indicated by the quoted yield point. It is important to understand that the stress-relief means 10, 11, 12, etc., must each be made effective when loaded to apply the desired predetermined compressive force to a stator 3 responsive to the stator being mounted for operation in the bore 2A. In each application of the invention that desired, predetermined compressive force can be ascertained empirically by determining the compressive force that will be transmitted to the stator 3 from the areas of lowest radial rigidity of the annular support ribs, through the core support members 4 and 7 at the upper and lower surfaces of the stator 3 (as seen in FIGS. 1 and 2). Thus, the materials used to form the bars 10 and 10A, as well as the connection arrangement between the bars 10 and 10A and the respective pins 18 and 18A of the mounting means will determine the compressive force that will be transmitted from the stress-relief means 10 to the core support member 5. That force can be varied by changing the radial thickness or rigidity of the bars 10 and 10A, or by changing the mounting means by which the bars 10 and 10A are mounted relative to the annular rib 1B. In addition, it will be recognized that in certain embodiments of the invention it is only necessary to use a single bar 10A to form the stress-relief means 10, rather than using two bars. However, as indicated above, the use of the two bars 10A and 10B is preferred in order to prevent a twisting action from being applied to the annular rib 1B, as would occur if a single bar 10A were mounted on one side of the rib.

Figure 6:
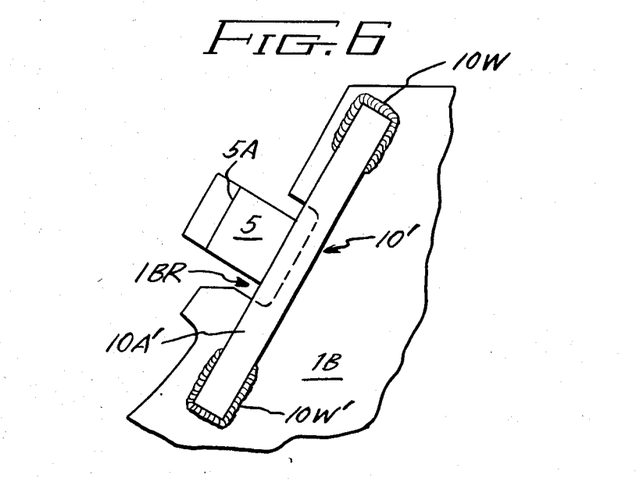
FIG. 6 is an end elevation view of a fragment of an annular rib of a stator support structure, such as that shown in FIG. 1, having an alternative embodiment of a stress-relief means mounted thereon according to a modified form of the most preferred embodiment of the present invention.

In addition, the pivotal arrangement of the two bars 10A and 10B, relative to the pins 18 and 18A, as described above, is preferred in practicing the invention. However, in alternative embodiments of the invention, it will be recognized that the mounting means for the bars 10A and 10B can be changed so that the opposite ends of the bars are rigidly fixed relative to the annular rib 1B. Referring to FIG. 6 of the drawing, such an alternative embodiment of the invention will be briefly described, using like call-out numbers for similar component parts. Thus, there is shown an annular rib section 1B positioned adjacent to a core support member 5 having a recessed portion 1BR that enables the core support member 5 to be moved radially outward without coming into abutting engagement with the rib 1B. A stress-relief means 10' is formed by welding a single steel bar 10A' at its opposite ends to the rib 1B, as shown by the welds 10W and 10W'. Such an arrangement of the stress-relief means 10' allows the central portion of the bar 10A' be deflected radially outward responsive to a compressive force being transmitted to it from the support member 5 as a stator it expands outwardly against the core support member 5. However, it is difficult to determine in advance exactly the desired compressive force that will be transmitted by such a rigidly welded bar 10A' to the core support member 5, because the bending moments of the bar 10A' around its welded ends will vary depending on the axial lengths of the welds and the resultant bending or points of deflection of the bar 10A'. Moreover, there is greater risk of approaching and undesirably exceeding the elastic limits of the bar 10A' with such a rigidly welded arrangement compared to the preferred embodiment described initially, above. Thus, it is preferred to use the relatively free-moving pivotal ends of the bars 10A and 10B, as described above in the preferred embodiment of the invention.

In the operation of the preferred form of the invention first described above, the stator support structure housing is provided with the annular ribs 1B–1D on which there is mounted the plurality of stress-relief means 10, 11, 12, etc., in combination with the respective core-supporting members 5, 6, 8 and 9. In addition, core-supporting members 4 and 7 are mounted directly on upper and lower portions of the annular ribs adjacent their respective areas of lowest radial rigidity. A stator core 3 that is designed to be interference-fitted into the bore 2A is thermally treated to shrink it sufficiently to fit freely within the core support members 4–9, then the stator 3 is allowed to equalize in temperature with the temperature of the housing 1 so that a compressive force is transmitted between the stator 3 and the ribs of the core support structure 2 by the core support members 4–9. Due to the carefully determined reactive compressive force of the respective stress-relief means 10, 11, 12, etc., the expansion of the stator 3 relative to the housing 1 causes the stress-relief means to be deflected (as best seen in FIG. 4) a predetermined amount which equals the amount of deflection of the annular ribs 1B–1D at their areas of lowest radial rigidity adjacent the core support members 4 and 7. Consequently, a high-pressure interference fit is formed between the stator 3 and the core support members 4–9, without causing the stator to be deflected to an undesirable out-of-round configuration.

It will be recognized that a particularly suitable application for the invention is on those dynamoelectric machines that have relatively thin stator cores, i.e., stator cores that are designed for relatively low-speed machines and are provided with deep winding slots which tend to weaken the radial rigidity of the core. On higher speed machines, which tend to have shallower winding slots, the core is often sufficiently radially rigid to adequately withstand significant differences in compressive forces applied to it from different arcuately spaced points by the associated stator support structure 2, but even with such high-speed machine stator cores the present invention affords the desired advantage of enabling a very high compressive force to be applied to the stator core without danger of unacceptable distortion of the core. Consequently, it is possible to avoid the requirement of providing further stator keying means to prevent undesirable rotation of the stator relative to the stator support structure 2 as might occur without utilizing the present invention.

Now that the invention has been described with respect to a stator support structure on which it can be advantageously employed, it will be further described with respect to a stator and stator support structure assembly that is constructed according to a further preferred embodiment of the invention. In describing such an assembly, reference will be made to the above-noted figures of the drawings and similar component parts will be identified by like reference numbers. Thus, a preferred stator and stator support structure assembly constructed according to the invention would comprise a housing 1 having annular ribs and end walls, and associated core supporting members and stress-relief means as illustrated in FIG. 1 and described in detail above. A stator comprising a magnetic core 3 is mounted within the bore 2A and each of the core support members 4–9 is compressed between the stator core and the annular ribs 1B–1D. A first group of core support members 5, 6, 8 and 9 is positioned adjacent the areas of high radial rigidity of the respective annular ribs, while a second group of core support members 4 and 7 is positioned adjacent areas of lower radial rigidity of the housing ribs. A plurality of stress-relief means 10–17, etc., is mounted at predetermined spaced points on at least two of the housing ribs adjacent their areas of highest radial rigidity to enable the stress-relief means to apply a predetermined compressive force to one of the core support members in the first group (5, 6, 8 and 9) and to prevent the stator core 3 or the core support members from engaging the areas of highest radial rigidity of the housing ribs. The core support members 4 and 7 in the second group are each arranged to engage the housing ribs 1B–1D adjacent a respective one of the areas of lower radial rigidity thereof. Each of the stress-relief means 10–17, etc., is made to have a compressive force, or reaction force, that is transmitted to the juxtaposed stator core support members 5, 6, 8 and 9 in the first group that is about equal to the compressive force that is transmitted from the housing ribs and the lower radial rigidity areas thereof to the juxtaposed core support members 4 and 7 in the second group. Consequently, the compressive force that is transmitted to each of the core support members in the first and second groups is substantially equal and is effective in combination to support the stator core 3 in a predetermined geometric configuration. In the normal situation, the desired predetermined geometric configuration of the stator core will constititute a cylindrical configuration; thus, the compressive forces that are transmitted through the first group of core support members 5, 6, 8 and 9 will all be made essentially equal, and will also be made essentially equal to the compressive forces transmitted through the core support members 4 and 7 of the second group of such members, in this second preferred embodiment of the invention.

In the preferred embodiment of a stator and stator core support structure assembly just described it is desirable to prevent excessive compressive forces from being transmitted to the end walls 1A and 1E of the housing 1. To achieve that objective, each of the core support members 4–9 comprises a steel bar that is mounted adjacent the outer periphery of the magnetic stator core 3 over substantially its full axial length. As shown, the desired plurality of housing ribs comprises at least three generally parallel annular ribs and the core support members 4–9 are also affixed to the outer end walls 1A and 1E of housing 1 by welding or other conventional means. The axially outer ends of each of the core support members is provided with a radially recessed outer surface, such as the surfaces 5A and 5B described above, in order to reduce the compressive forces that can be transmitted through the core support members to the outer end walls of the housing 1, relative to the compressive forces that are transmitted to the three annular housing ribs in response to an interference fit being established between the core support members and the housing ribs and the respective stress-relief means mounted on them.

Figure 7:
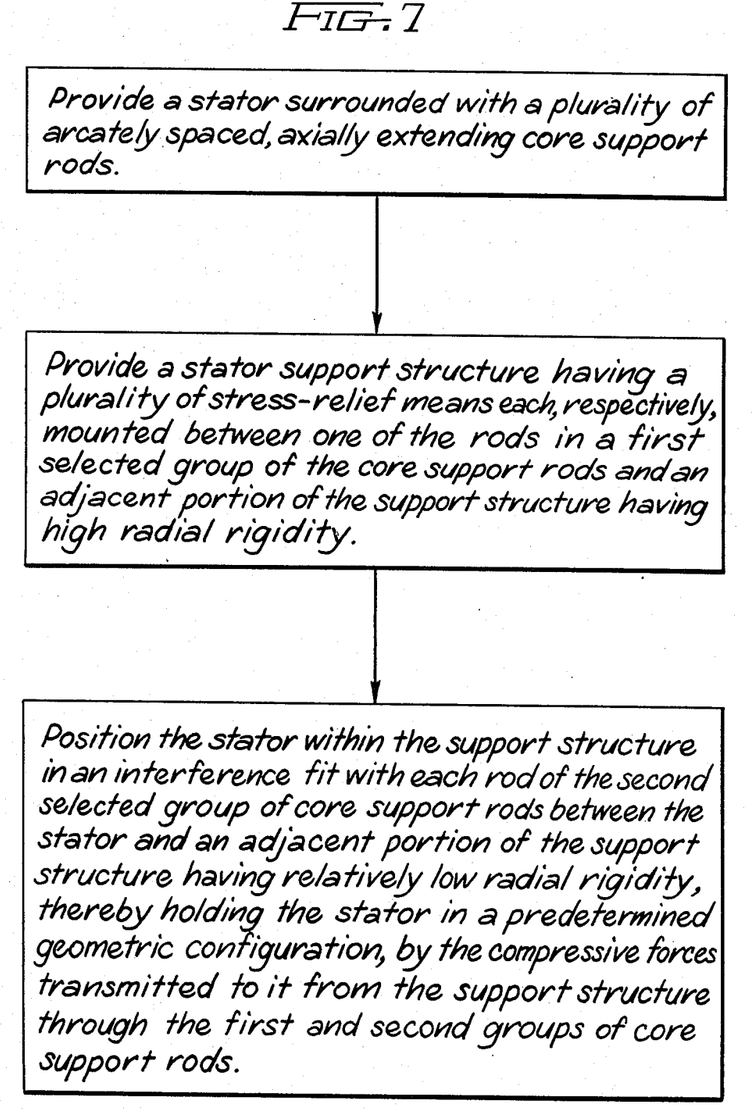
FIG. 7 is a flow chart describing the steps of a preferred arrangement of the method of the invention.

The novel method of the invention for making a stator and stator support structure assembly is particularly useful in machines that require an interference fit between a stator and its associated stator support structure. The preferred method steps of the invention are generally outlined in FIG. 7 and are applied as follows: First, provide a stator with a plurality of axially-extending core support members such as the steel rods 4–9 discussed above. The rods are disposed at arcuately spaced points around the circumference of the stator by mounting them either on the stator or on an associated support structure. Next, provide a stator support structure having a plurality of stress-relief means each, respectively, mounted between one of the rods of a selected first group of core support rods on the stator circumference and an adjacent portion of the stator support structure having high radial rigidity. This arrangement places each of the stress-relief means in compression, as will be seen, responsive to the stator being inserted into the support structure and the subsequent equalization of the temperatures of the stator and the stator support structure. Each of the rods in a second selected group of the core support rods is also thus placed in compression between the stator and a second portion of the support structure having a lower radially rigid construction, i.e., in response to such an equalization of temperatures after the stator is positioned within the support structure. The resultant interference fit holds the stator in a preselected geometric configuration within a preselected range of tolerances due to the compressive forces transmitted to it from the support structure through the first and second groups of axially extending rods. As discussed above in disclosing the preferred structures of the invention, in the method of the invention the interference fit between the stator and support structure is completed by effecting a change in relative temperatures between the stator and the stator support structure to enable the stator to be inserted freely within the support structure. After a suitable relative change in diameters is realized, the stator is inserted into the stator support structure and the temperatures between those members are allowed to equalize in order to achieve an interference fit between them.

The most preferred embodiment of the disclosed method includes the step of making each of the stress-relief means effective to apply a compressive force on the respective core support rods in the first group that is substantially equal to the compressive force applied to each of the rods in the second group of core support rods by the stator, responsive to such an equalization of temperatures between the stator and stator support structure to establish the desired interference fit. Further, in the disclosed embodiment, the first step of the preferred method preferably involves making the stator substantially cylindrical in configuration and mounting the core support rods at selected spaced points on the circumference of the stator to effectively equalize the distribution of compressive force applied to the stator from the support structure. The third step of the method of the preferred embodiment of the invention described above is further improved by making the geometric configuration that is desired a cylinder that has a uniform inner diameter within a range of tolerances of ±2 mils, after equalization of the temperatures of the stator and stator support structure is achieved to effect the desired interference fit.

The stress-relief means used in practicing the preferred steps of the method of the invention can take various forms, such as those described above with reference to FIGS. 3-5 and 6 of the drawing; however, in the preferred method each of the stress-relief means includes a pair of steel bars (such as bars 10A and 10B) that are mounted in parallel on opposite sides of the respective generally annular ribs (such as rib 1B) of the support structure. The opposite ends of each of the bars is mounted, respectively, on pins (such as pins 18 and 18A) which, in turn, are suitably supported on the support structure rib. This method of mounting the bars of the stress-relief means enables the bars to be deflected around the longitudinal axes of the mounting pins in response to compressive force being applied to the centers of the bars as a consequence of the interference fit being established between the stator and the support structure.

From the foregoing description of the invention it will be apparent that various further modifications and alternative forms of it will be made obvious to those skilled in the art. It is my intention to encompass within the scope of the following claims all such modifications and alternative forms.

I claim:

1. A stator support structure comprising: a housing having a plurality of axially spaced ribs defining a bore for receiving a stator therein, each of at least two of said ribs having areas of high radial rigidity in an outward direction and separate areas of lower radial rigidity in an outward direction, the areas of lower rigidity being spaced a substantial arcuate distance from the areas of high rigidity; and a plurality of stress relief means mounted respectively at predetermined spaced points on said two of said ribs adjacent their areas of high radial rigidity for applying predetermined compressive forces to a stator received in said bore, said stress relief means each comprising a bar and mounting means for mounting opposite end portions of the bar to the rib to which it is mounted and positioning a central portion of the bar in spatial relation to the respective rib to permit radial outward flexing of the bar without moving into abutting engagement with the rib, said mounting means comprising a pivot means at each end portion of said bar for pivotably connecting the end portions of the bar to the rib to which it is mounted enabling substantial unopposed pivoting of the end portions of the bar relative to the respective rib.

2. The stator support structure of claim 1 wherein said pivot means comprises a pin extending into the respective bar and rib to which it is mounted, said pin being rotatable relative to one of the bar and rib.

3. The stator support structure of claim 2 wherein said pin extends into and is free to rotate within an aperture in the rib to which it is mounted.

4. The stator support structure of claim 2 wherein said pin is fixed to the rib to which it is mounted and the respective bar is rotatable on said pin.

5. The stator support structure of claim 1 wherein said stress relief means each comprises a second bar having end portions rotatably connected to the rib to which it is mounted, said bars on each rib being positioned on axially opposite sides of the pertaining rib.

6. The stator support structure of claim 5 wherein said pivot means comprises a pair of pins passing through respective apertures in the pertaining rib and each being connected to an end portion of the respective said bars.

7. A stator support structure comprising a housing having a plurality of ribs arranged to define a bore for receiving a stator therein, each of at least two of said ribs having areas of high radial rigidity and separate areas of lower radial rigidity thereon, the areas of lowest radial rigidity on said ribs being spaced a substantial arcuate distance from the areas of highest radial rigidity on the ribs; and a plurality of stress relief means mounted, respectively, at predetermined spaced points on said at least two ribs adjacent their areas of highest radial rigidity, each of said stress relief means being effective to apply a predetermined compressive force to a stator responsive to the stator being mounted for operation within said bore, said predetermined compressive force applied by each of said stress relief means being effective, in combination with other radial compressive forces applied to the stator from the areas of lowest radial rigidity of said ribs to support the stator in a preselected geometric configuration within a narrow range of tolerances; each of said stress relief means comprising a pair of bars, each positioned, respectively, on opposite sides of a rib and including mounting means for mounting opposite ends of each bar in relatively fixed relation to the rib on which it is mounted while positioning a central portion of the bar in spaced relation to said rib to transmit said predetermined force to a stator; each of said ribs having a radially innermost surface that conforms generally in configuration to the radially outermost surface of a stator adapted to be positioned within said bore, except for a plurality of recesses defined in each of said innermost surfaces adjacent the central portion of each of said bars, each of said mounting means being effective to mount one of the opposite ends of a respective one of said bars in relatively fixed relation to the rib, thereby to place said opposite ends, respectively, on opposite sides of one of said recesses; the central portion of each of said bars being positioned generally parallel to a side of the rib on which it is mounted, and being free to be deflected radially outward a predetermined distance without moving into abutting engagement with said rib, responsive to a compressive force being transmitted from the bar to a stator positioned in said bore; each of said mounting means comprising a pair of fulcrum supports that, respectively, engage said bars adjacent to opposite ends thereof and are effective to support said opposite ends for rotational movement around the fulcrum supports responsive to said compressive force being applied to the central portions of the bars to deflect them radially outward; each pair of fulcrum supports comprising a pair of pins mounted, respectively, in fixed position on their associated rib and disposed to project from a side thereof in a direction generally transverse to the direction of said radial deflection of the bar mounted thereon; apertures through the ribs adjacent opposite sides of the respective recesses for receiving one of said pins, respectively, through each of said apertures, each pin being disposed in a respective aperture to project outward from opposite sides of the rib; each of said pins being secured in position relative to the bars supported thereon to effectively limit movement of the bars in the axial direction of the pins while enabling the bars to pivot around the longitudinal axis of each of the respective pins; each of said pins being free to rotate in the aperture through the rib in which it is mounted.

8. A stator and stator support structure assembly comprising: a housing having a plurality of axially spaced ribs having inner edge portions defining a bore, each of at least two of said ribs having areas of high radial rigidity in an outward direction and separate areas of lower radial rigidity in an outward direction, the areas of lower rigidity being spaced a substantial arcuate distance from the areas of high rigidity; a stator including a magnetic core being received in the bore and a plurality of support members disposed at arcuately spaced points around the outer periphery of the core; a first group of said support members being compressed between said core and areas of said ribs having lower radial rigidity; a plurality of stress relief means mounted, respectively, at predetermined spaced points on said two ribs adjacent their areas of high radial rigidity for applying predetermined respective compressive forces to a second group of said support members compressed between said stress relief means and said core, the compressive force applied by each of said stress relief means on said second group of support elements being substantially equal to respective compressive forces exerted on said first group of support elements by the areas of lower radial rigidity of the same rib.

9. The stator and stator support structure of claim 8 wherein said support elements are elongate members extending axially in the bore, and said stress-relief means each comprises a bar mounted to the pertaining rib wherein the bar has end portions secured to the rib and a central portion in abutment with an elongate member, the central portion of the bar exerting a yieldable compressive force on the elongate member in abutment therewith.

10. The stator and stator support structure of claim 9 wherein the end portions of the bar are rotatably connected to the pertaining rib.

11. The stator and stator support structure of claim 9 wherein said ribs include recesses adjacent the central portions of said bars to accommodate radial outward movement of the elongate members in abutment with said bars.

12. The stator and stator support structure of claim 8 wherein said stress relief means each comprises: a pair of bars exerting yieldable compressive forces on a support member of the second group, means for rotatably mounting opposite end portions of said bars to the pertaining rib, the bars including central portions that are substantially unsupported and accordingly are free to flex radially and thereby exert the yieldable compressive forces on the pertaining support members.

13. The stator and stator support structure of claim 12 wherein said bars are on opposite sides of the pertaining rib and said means for rotatably mounting comprises a pair of pins extending through the pertaining rib and engaging said bars.

14. The stator and stator support structure of claim 12 including a recess in each of said ribs to which a bar is mounted, said recesses being located adjacent the respective support members to permit outward movement of the support members of the second group without abutting the ribs.

15. A stator and stator support structure assembly comprising: a housing having a plurality of axially spaced ribs having inner edge portions defining a bore, each of at least two of said ribs having areas of high radial rigidity in an outward direction and separate areas of lower radial rigidity in an outward direction, the areas of lower rigidity being spaced a substantial arcuate distance from the areas of high rigidity; a stator including a magnetic core received in the bore; said ribs applying compressive forces on said stator in the areas of said ribs of lower radial rigidity; and a plurality of stress-relief means mounted, respectively, at predetermined spaced points on said two ribs adjacent their areas of high radial rigidity for applying predetermined respective compressive forces to said stator at positions arcuately spaced from the positions at which the areas of lower rigidity apply compressive forces on said stator, the compressive force applied by each of said stress relief means being substantially equal to the compressive force applied by each of the areas of lower rigidity for the same rib.

16. A stator and stator support structure assembly comprising a housing having a plurality of ribs arranged to define a bore for receiving a stator therein, each of at least two of said ribs having areas of high radial rigidity and separate areas of lower radial rigidity thereon, the areas of lowest radial rigidity being spaced a substantial arcuate distance from the areas of highest radial rigidity, a stator comprising a magnetic core and a plurality of core support members disposed at arcuately spaced points around the outer periphery of the core, each of said core support members being compressed between the core and said ribs with a first group of said core support members positioned adjacent said areas of high radial rigidity and a second group of said core support members positioned adjacent said areas of lower radial rigidity of the housing ribs, and a plurality of stress-relief means mounted at predetermined spaced points on said at least two ribs adjacent their areas of high radial rigidity thereby to enable each stress relief means to apply a predetermined compressive force to one of the core support members in said first group and to prevent the stator core or core support members from engaging the areas of high radially rigidity of said ribs, each of the core support members in said second group being arranged to engage said at least two ribs adjacent a respective one of said areas of lower radial rigidity thereof, the compressive force transmitted from each of said stress-relief means to a juxtaposed core support member in the first group being about equal to that transmitted from said ribs in the areas of lower radial rigidity thereof to a juxtaposed core support member in the second group, whereby the compressive forces transmitted to each of the core support members in said first and second groups is substantially equal and is effective in combination to support the stator in a predetermined geometric configuration.

17. An invention as defined in claim 16 wherein said magnetic core is generally cylindrical in configuration, and said core support members each comprise a rod mounted adjacent the outer periphery of the magnetic stator core over substantially its full axial length, and wherein said plurality of ribs comprises at least three generally parallel annular ribs, and the two outer end walls of the housing are positioned in engagement with all of the core support members, the axially outer ends of each of said core support members being provided with a radially recessed outer surface relative to the respective axially central area of the member thereby to reduce the compressive forces transmitted through the core support members to the two outer end walls of the housing, relative to the compressive forces transmitted to said three annular ribs responsive to an interference fit being established between the core support members, said housing ribs and the stress-relief means thereon.

* * * * *